July 9, 1968

ELISABETH BAUMEIGE NÉE BEREGI 3,391,619

MACHINE FOR PRODUCING CYLINDRICAL SECTIONS OF BOXES

Filed Aug. 4, 1966

INVENTOR

ELISABETH BAUMEIGE

BY Young & Thompson

ATTORNEYS

July 9, 1968

ELISABETH BAUMEIGE NÉE BEREGI 3,391,619

MACHINE FOR PRODUCING CYLINDRICAL SECTIONS OF BOXES

Filed Aug. 4, 1966

INVENTOR

ELISABETH BAUMEIGE

BY Young & Thompson

ATTORNEYS

United States Patent Office 3,391,619
Patented July 9, 1968

3,391,619
MACHINE FOR PRODUCING CYLINDRICAL
SECTIONS OF BOXES
Elisabeth Baumeige, née Beregi, 192 Rte. de Pessicart, Nice, France
Filed Aug. 4, 1966, Ser. No. 570,274
Claims priority, application France, Aug. 17, 1965, 7,642, Patent 1,445,314
3 Claims. (Cl. 93—81)

My invention has for its object a machine for producing cylindrical or the like peripheral sections of boxes, sheaths and the like, starting from a sheet of plastic material which is first wound into shape and the edges of which are then assembled through gluing. The components of said improved machine and the procedure to be followed by way of example for the execution of a cylindrical box will now be disclosed. A hollow stationary cylinder is provided along a generating line with a slot through which the sheet of plastic material is introduced so as to engage upon bending the inner wall of the cylinder until its edges overlap in registry with the slot.

A cylindrical mandrel is arranged coaxially with said cylinder so as to be axially shiftable therein and to be introduced into the sheet wound inside the cylinder. Said mandrel carries a ring adapted to slide freely over it and it is associated with a rule parallel with its generating lines, said rule being adapted to be lowered onto the mandrel and to be subsequently raised. Said rule is located in a manner such that when the mandrel enters the cylinder, it extends above an edge of the slot in the cylinder and, when lowered, urges against each other the two overlapping edges of the sheet of plastic material, so as to clamp them over each other.

During operation, when the mandrel is caused to progress inside the cylinder, the movable ring carried by it abuts against the cylinder and recedes towards the rear end of the mandrel, while the sheet-compressing rule is lowered under the action of its weight or of a spring onto the edges of the sheet. The mandrel carrying the sheet with the ring to the rear of said sheet is then caused to recede. During the first fraction of its receding movement, a suitable mechanism glues the edges of the sheet over each other, after which the compressing rule rises and the ring engages a stationary stop whereupon the tube formed by the sheet of plastic or the like material, thus released by the rule and stopped by the ring slides over the receding mandrel, so as to be released with reference to the latter and to drop out of the machine. The rearward movement of the mandrel is stopped at the moment at which the ring still engages it at its front end, the arrangement being then ready for a further operation.

I have illustrated in the accompanying drawing, by way of example and in a somewhat diagrammatic manner a preferred embodiment of my improved machine; in said drawings.

In said drawings, C designates the hollow cylinder carried at one end by a suitable stationary frame 1 and provided at 2 with a longitudinal slot the edges of which are bevelled so as to further the introduction of the sheet of plastic material in a sloping direction into said slot whereby it may thereafter slide over the inner surface of the cylinder. The reference number 3 designates a plate adapted to aline the edge of the sheet entering the slot.

Figure 2:
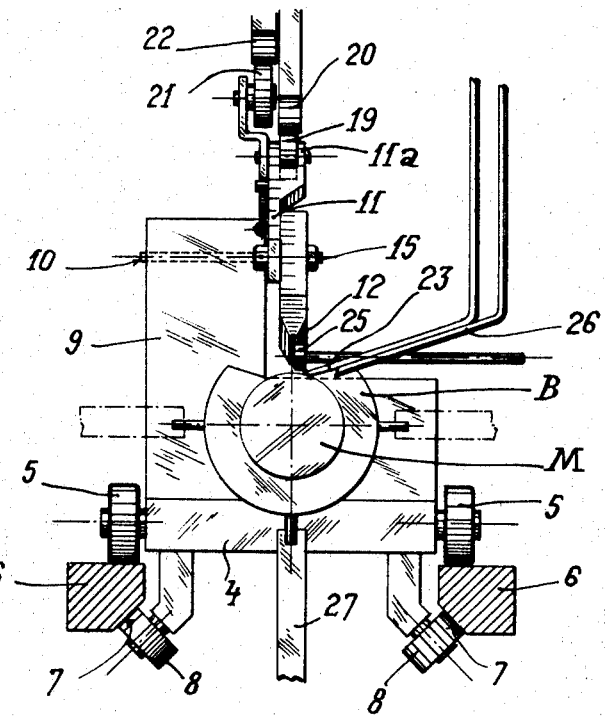
FIG. 2 is a cross-section through line II—II of FIG. 1.
Figure 3:
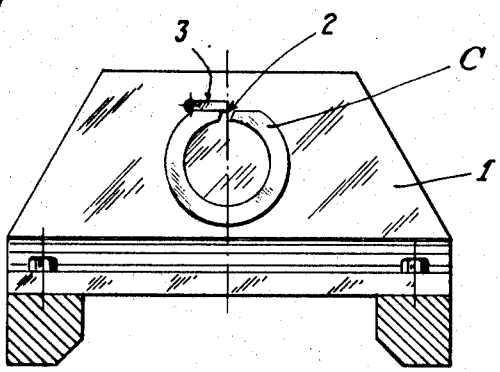
FIG. 3 is a cross-section of the cylinder, considered alone on its frame, through line III—III of FIG. 1.

M designates the mandrel adapted to be fitted coaxially inside the cylinder C and to slide therein, the common axis of the two parts being shown at OO. Said mandrel is carried by a carriage 4, the wheels 5 of which run over the rails 6, so as to progress in parallelism with said axis OO. To this end, the rails are given the cross-section illustrated in FIG. 2 i.e. they show transverse bevelled sections 7 the slopes of which form a downwardly flaring system, said bevelled sections being engaged by rollers 8 carried by the carriage, which latter is also rigid with an upper fitting 9 carrying a pivotal spindle 10 rigid with the lever 11 controlling the lowering and raising of the horizontal rule 12 adapted to compress the sheet edges.

To allow adjusting the position of said rule so that it may engage reliably throughout its length the location of the mandrel and register with an edge of the cylinder slot, said rule 12 is carried by the lever 11 through the agency of an arm 13 provided with a slot 14 and secured to said lever 11 by a clamping screw 15 passing through said slot.

Figure 1:
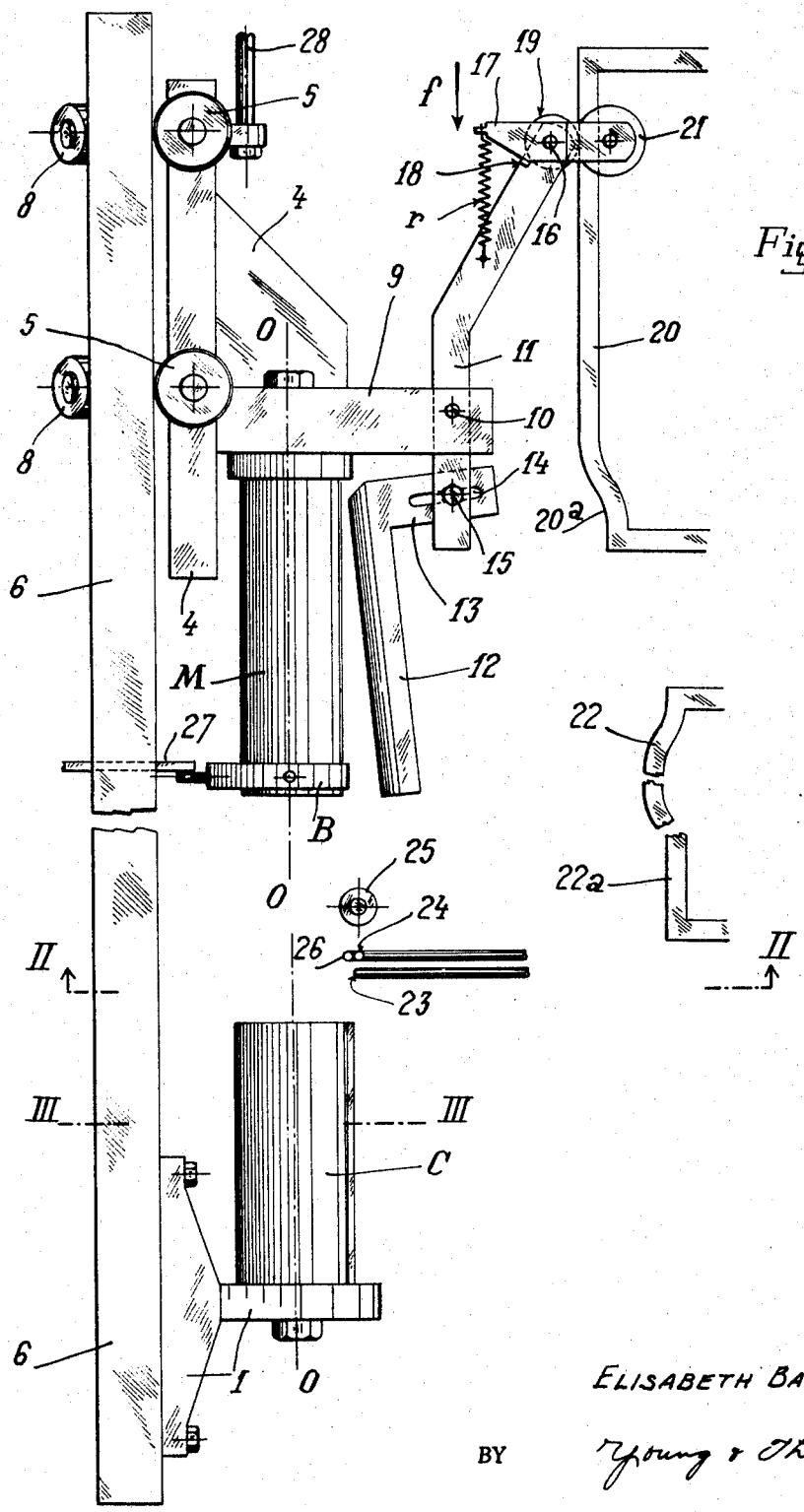
FIG. 1 is a lateral elevational view of the machine showing diagrammatically the initial spacing between the mandrel and the cylinder with part broken off.

The upper bent end of the lever 11 terminates with a fork 11a carrying a stud 16 to which is pivotally secured an arm 17 urged by a spring r against a stop 18 on the lever 11 limiting its rotation in the direction of the arrow f, so that normally said arm 17 is held in a vertical position as illustrated in FIG. 1, while remaining free to pivot in the direction of rotation opposed to said arrow. The stud 16 carries also a roller 19 cooperating with a stationary cam-forming rail 20 along which it runs, while the upper end of said arm 17 carries a further roller 21 adapted to engage a stationary cam 22.

At the beginning of the forward movement of the carriage and as illustrated in FIG. 1, the roller 19 engages the lower edge of the cam-forming rail 20 so as to hold the sheet-compressing rule 12 in a raised position until an upwardly directed slope 20a formed on the rail 20 allows the roller 19 to move freely, whereupon the rule 12 drops under the action of its own weight; however, the roller 21 is immediately operative and replaces the roller 19 by engaging the cam 22, which lowers again the arm 17, after which at the point 22a, it allows said arm to rise freely. The rule 12, which has been transiently lowered and raised again at the moment at which the mandrel M has entered the cylinder C is finally lowered when the mandrel is located inside the plastic sheet which has been previously inserted in the cylinder. It should be remarked that the ring B carried by the mandrel is adapted to freely slide over the latter and to abut then against the end of the cylinder, when the mandrel is being inserted inside the cylinder; said ring is thus shifted onto the rear end of the mandrel to the rear of the sheet of plastic material which is clamped on the mandrel so as to be consequently carried along with it during the return movement of the carriage 4.

When the mandrel is being urged back out of the cylinder the rule 12 remains engaged over the edges of the sheet so as to allow the gluing of the said edges together. As a matter of fact, during said receding return movement of the carriage, the roller 21 engages again the cam 22 without acting now on the lever 11 since the arm 17 is adapted to rock freely in a direction opposed to the arrow f independently of the lever. The gluing is then performed automatically by a stationary system including the following parts: a thin blade 23 engaged between the two edges of the sheet so as to space them slightly, whereby the glue injected by the narrow tube 24 enters the gap between said edges, a presser roller 25 clamps then the two edges against each other, while cleaning and drying air is injected onto them by the nozzle 26.

When the gluing has been obtained, the roller 19 returns into contact with the slope 20a and the rail 20 so as to raise the rule 12 before the ring B abuts against the stationary stop 27. The carriage continues its rearward motion until it reaches its starting position while the rule 12 remains in its raised position, as provided by the rectilinear rail section 20; the ring B causes then the plastic tube obtained to slide with it along the mandrel; the tube is thus released and drops while all the parts have now returned into their starting position and are ready for a further operation.

It should be understood that the movements of the carriage 4 may be executed by hand or else they may be controlled automatically by a suitable mechanism connected with the bar 28 rigid with the rear of the carriage. On the other hand, the means lowering and raising the compressing rule 12, and the other structural parts may be modified or replaced by other means or parts without widening the scope of the invention defined by the accompanying claims.

Obviously, my improved machine may serve for producing not only cylindrical boxes, but also conical, frustoconical, and the like boxes or the like parts.

It is also possible to provide a blast of compressed air between the sheet of plastic material and the cylinder C with a view to uniformly urging the sheet onto the peripheral surface of the mandrel.

What I claim is:

1. A machine for producing the peripheral sections of boxes and the like parts out of a sheet of material comprising a hollow stationary cylinder provided with a longitudinal slot through which said sheet is adapted to be engaged and to be wound inside the cylinder with its edges overlapping each other in registry with an edge of the slot, a mandrel adapted to slide coaxially inside the cylinder in a predetermined direction to engage the sheet wound inside the latter and to thenafter recede, a carriage carrying the mandrel and adapted to assume a reciprocatory movement, a ring carried by the mandrel slidingly to engage the rear end of the cylinder when the mandrel progresses inside the latter in said predetermined direction, a rule adapted to be shifted between a normal inoperative position and a position engaging a slot in the cylinder, means pivotally securing the rule to the carriage, stationary cams controlling the movements of said rule between said positions during the sliding movement of the carriage and stationary means adapted to insert glue between the overlapping edges of the sheet as it passes in front of said means during the first fraction of the receding sliding movement of the mandrel.

2. A machine as claimed in claim 1, comprising a stationary abutment arresting the rearward movement of the ring substantially at the end of the first fraction of the receding sliding movement of the mandrel out of the cylinder.

3. A machine as claimed in claim 1, comprising means controlled by the stationary cams and controlling the movements of the rule to urge the latter into engagement with the cylinder slot respectively when the mandrel is at the beginning and at the end of its movements in the predetermined direction and during operation of the glue-inserting means.

References Cited

UNITED STATES PATENTS 2,355,985   8/1944   MacFarland _____ 93—81
3,049,979   8/1964   Sayford _____ 93—39.3

BERNARD STICKNEY, *Primary Examiner.*